P. P. GILLES.

VACUUM FEED CARBURETER.

APPLICATION FILED SEPT. 16, 1919.

Reissued July 13, 1920.

14,912.

3 SHEETS—SHEET 1.

Inventor:
Pierre P. Gilles,
By Dyrenforth Lee Christy & Wiles,
Attys.

P. P. GILLES.

VACUUM FEED CARBURETER.

APPLICATION FILED SEPT. 16, 1919.

Reissued July 13, 1920.

14,912.

3 SHEETS—SHEET 2.

Inventor:
Pierre P. Gilles,
By Dyer, Brittain & Giles,
Atty's

P. P. GILLES.

VACUUM FEED CARBURETER.

APPLICATION FILED SEPT. 16, 1919.

Reissued July 13, 1920.

14,912.

3 SHEETS—SHEET 3.

Inventor:
Pierre P. Gilles,
By Dyer, Foster & Chritton & Wiles,
Atty's.

UNITED STATES PATENT OFFICE.

PIERRE P. GILLES, OF CHICAGO, ILLINOIS, ASSIGNOR, BY MESNE ASSIGNMENTS, TO GILLES FUEL FEEDING COMPANY, OF HOLYOKE, MASSACHUSETTS, A CORPORATION OF MASSACHUSETTS.

VACUUM-FEED CARBURETER.

14,912. Specification of Reissued Letters Patent. Reissued July 13, 1920.

Original No. 1,240,842, dated September 25, 1917, Serial No. 124,521, filed October 9, 1916. Application for reissue filed September 16, 1919. Serial No. 324,241.

*To all whom it may concern:*

Be it known that I, PIERRE P. GILLES, a citizen of the United States, residing at Chicago, in the county of Cook and State of Illinois, have invented a new and useful Improvement in Vacuum-Feed Carbureters, of which the following is a specification.

This invention relates generally to fuel feeding devices for supplying fuel to carbureters by suction from a low level supply tank. More particularly, the invention is concerned with a consolidation of the carbureter with the vacuum feed fuel supply device into a unitary structure which may be termed a vacuum feed carbureter. The invention also relates to improvements in fuel feeding devices of the type disclosed in my copending application Serial No. 101,755, filed June 5, 1916.

An object of the invention is to provide a vacuum feed carbureter, comprising a fuel supply chamber, having a float therein and devices controlled by the float to draw fuel into the chamber, and a carbureter fuel chamber fed from the supply chamber by gravity together with suitable atomizing devices in the carbureter chamber and adapted to be fed directly therefrom, the construction being characterized by the provision of a single float which controls the fuel level in both chambers.

Another object of the invention is to provide in a fuel feeding device for carbureters, a fuel supply chamber having a float therein and float controlled means for drawing fuel by suction into the chamber, a carbureter fuel chamber connected to the supply chamber to be fed therefrom by gravity, a valve to control the connection between said chambers, and means operable by rise and fall of the float to open and close said valve.

Another object of the invention is to provide in a fuel feeding device for carbureters, a suction passage communicating between the feeding device and the suction pipe of the carbureter, and means to vary the effective opening of said passage in proportion to the effective opening of the suction pipe.

Another object is to provide in a fuel feeding device for carbureters, a passage which constantly communicates the intake manifold with the fuel supply chamber and means for controlling said passage to control the fuel delivered to said chamber.

Other objects and advantages will appear in the following description and will be particularly pointed out in the appended claims.

One preferred embodiment of the invention is shown for illustrative purposes in the accompanying drawings, in which—

Figure 1:
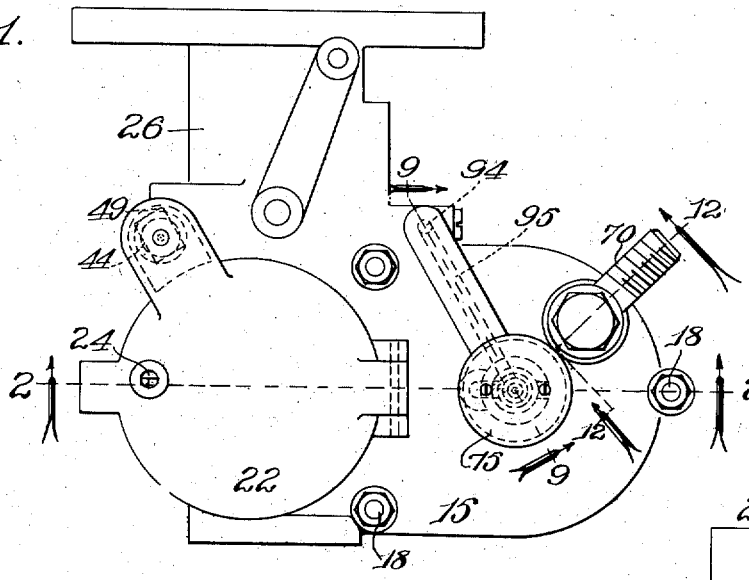
Figure 1 is a top plan view of the vacuum feed carbureter.
Figure 3:
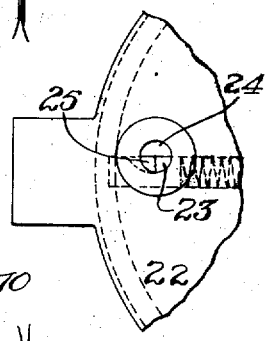
Fig. 3 is an enlarged fragmentary plan view of the cover.
Figure 2:
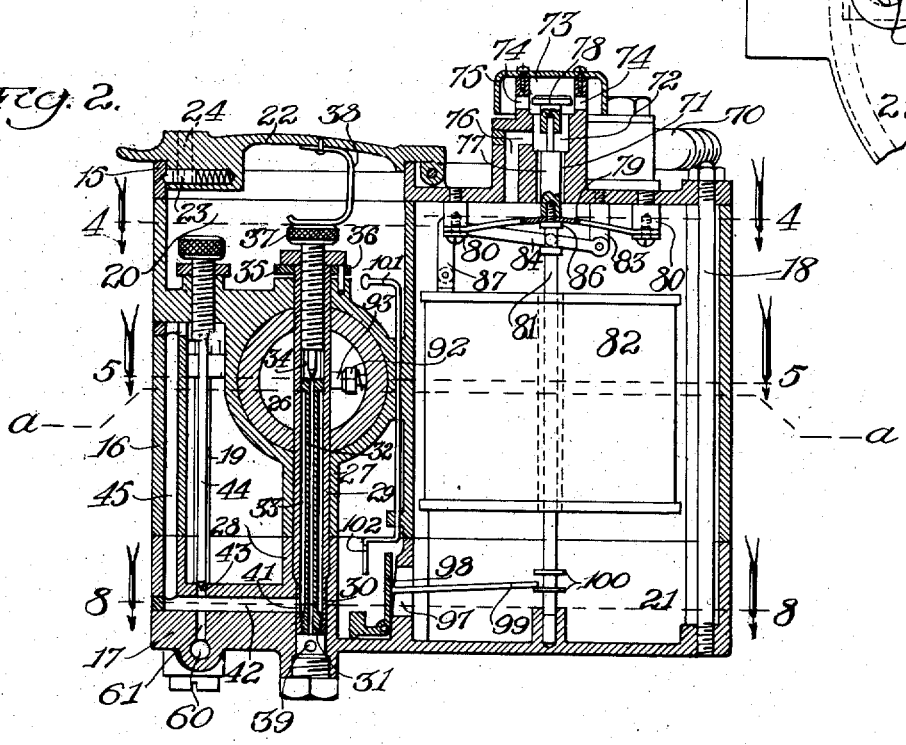
Fig. 2 is a sectional elevation thereof taken on the line 2—2 of Fig. 1.
Figure 4:
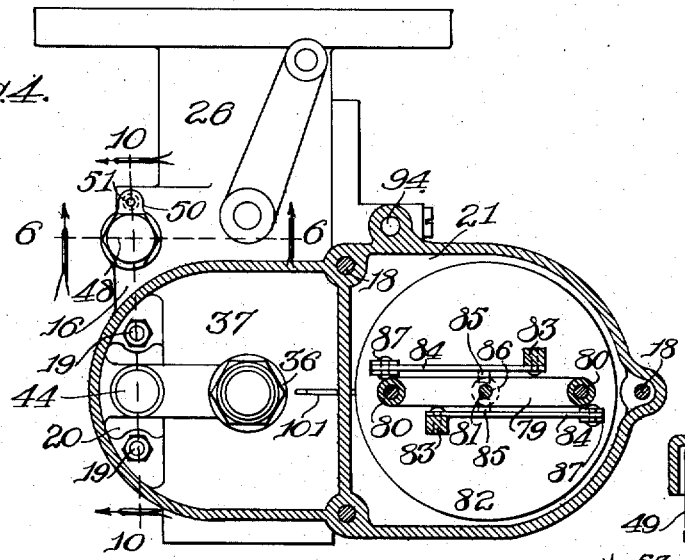
Figure 6:
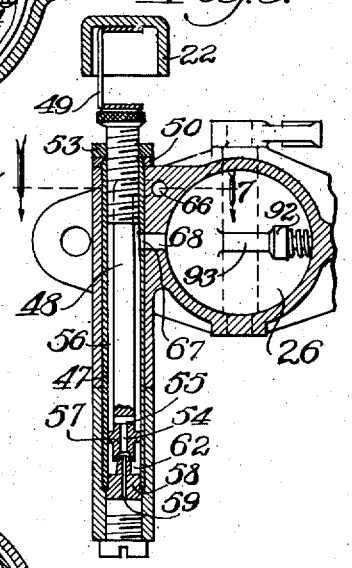
Figure 5:
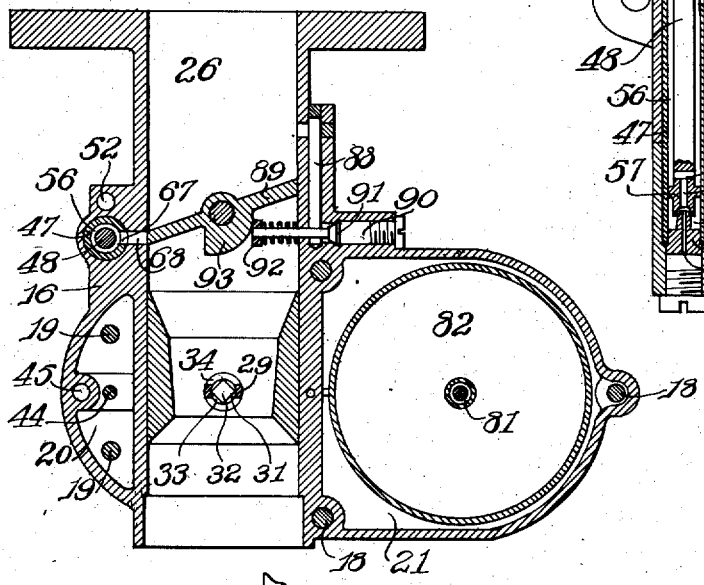
Figure 7:
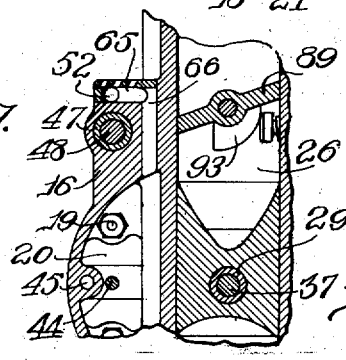
Figure 8:
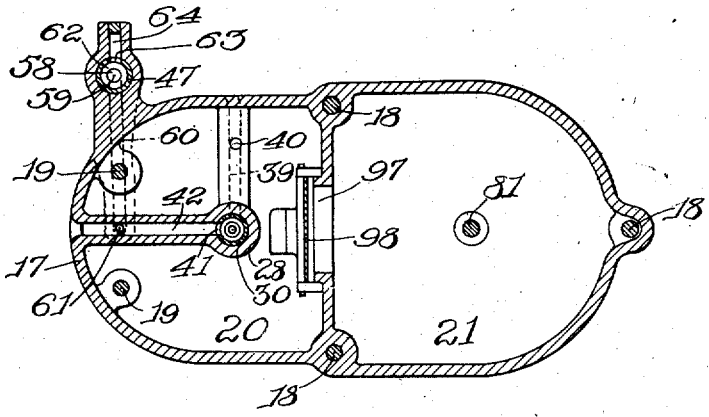
Figure 9:
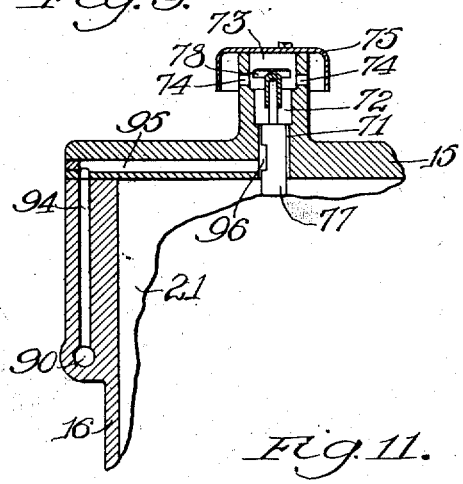
Figure 10:
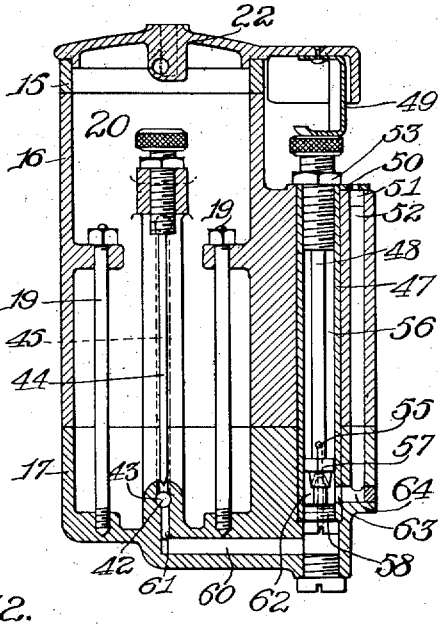
Figure 11:
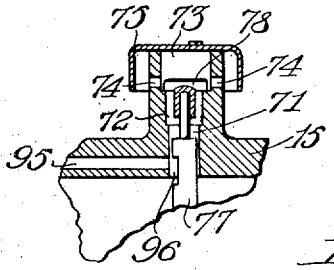
Figure 12:
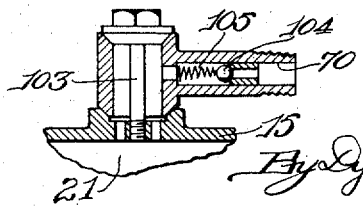

Figs. 4 and 5 are sectional plan views taken on the lines 4—4 and 5—5, respectively, of Fig. 2;

Fig. 6 is a partial sectional elevation taken on the line 6—6 of Fig. 4;

Fig. 7 is a fragmentary sectional plan view taken on the line 7—7 of Fig. 6;

Fig. 8 is a sectional plan view taken on the line 8—8 of Fig. 2;

Fig. 9 is a partial sectional elevation taken on the line 9—9 of Fig. 1;

Fig. 10 is a sectional elevation taken on the line 10—10 of Fig. 4;

Fig. 11 is a view similar to Fig. 9 showing the parts in a different relative position; and Fig. 12 is a fragmentary sectional elevation taken on the line 12—12 of Fig. 1.

Referring to these drawings, the carbureter casing, as shown in Fig. 2, comprises three sections, a top section 15, an intermediate section 16, and a base section 17. These several sections are held together by three rods 18 (Figs. 1, 2 and 4) which are threaded into section 17 to pass upwardly through sections 16 and 15 and are provided with suitable nuts to engage the upper face of the latter and by a pair of rods 19 similarly threaded into section 17 which pass upwardly through lugs on section 16, as shown in Fig. 10, and are provided with nuts to engage the latter. The described arrangement is preferred since it permits convenient assembly of parts. These sections, when assembled, form a closed casing, having two separate chambers 20 and 21 arranged side by side in adjacent relation. The top section 15 is provided with a hinged cover 22, which permits convenient access to chamber 20, and the cover is normally locked by a latch 23, spring pressed into engagement with a suitable notch in section 15. Cover 22 has a hole 24 therein to receive a suitable key (such as a half round piece of steel, for example), and latch 23 has a notch 25 therein to receive the lower end of the key, whereby the latch may be retracted in an obvious manner to unlock cover 22.

Chamber 20 constitutes a carbureter fuel chamber and extending horizontally therethrough is a suction pipe 26 which is integrally formed with section 16 and has a flanged end as shown adapted for connection to the intake manifold of the engine. An integral sleeve 27 depending from pipe 26 registers with an upwardly extending sleeve 28 integrally formed with section 17 so that a continuous passage is formed which extends from the base of the carbureter to the suction pipe, as shown in Fig. 2. A tube 29 extends from a point above the suction pipe 26 through the latter and into the passage in sleeves 27 and 28. The lower portion 30 of the tube 29 is of reduced diameter, and the bore of member 28 is correspondingly formed, so that the tube 29 may seat, as shown in Fig. 2, in member 28. Threaded into the base of tube 29 is a spindle 31 which extends upwardly within tube 29 to substantially the center of pipe 26 and is formed with an axial passage 32. The spindle 31 is so constructed, as shown in Figs. 2 and 5, as to form an annular passage 33 between it and the interior of tube 29 which passage is closed off at the base by the threaded portion of the sleeve. The upper portion of spindle 31 is squared, as shown in Fig. 5, so that it may engage the tube 29 for centering purposes without closing off communication with passage 33. Above spindle 31, the tube 29 has openings 34 (Figs. 2 and 5) communicating with pipe 26. Fixed to tube 29 at the top thereof is a disk 35 which is drilled to receive a pin 36 fixed in the upper portion of pipe 26, as best shown in Fig. 2. Threaded into the upper portion of tube 29 is a needle valve 37 which coöperates with spindle 31 to vary the effective outlet opening of passage 32. The latter forms the main nozzle, and the passage 33 the compensating nozzle, and both are arranged to deliver through the openings 34 into pipe 26. It is to be noted that the sleeve 29 with spindle 31 and valve 37 therein may be withdrawn vertically when cover 22 is opened, a spring 38 on the latter being provided to engage valve 37 to hold it and thus tube 29 in position. The pin 36 serves to prevent rotation of the latter and insures correct angular positioning of the tube 29 within members 27 and 28 for a reason later to appear.

In order to permit fuel from the carbureter chamber 20 to pass to the main nozzle, a transverse passage 39 (Fig. 8) is formed in the base of section 17 which communicates with the space in member 28 below the members 29 and 31, as shown in Fig. 2. A vertical hole 40 (Fig. 8) communicates between the chamber 20 and passage 39. The lower portion 30 of sleeve 29 has an opening 41 therein which, by reason of pin 36 and disk 35 is caused to register with a passage 42 (Figs. 2 and 8) arranged at right angles to passage 39 as clearly shown in Fig. 8. An opening 43 permits fuel to flow from chamber 20 into passage 42, and this opening may be varied by a needle valve 44, which is suitably mounted in a lug in section 16 and has a knurled head disposed just beneath cover 22 for convenient actuation, as shown in Figs. 2 and 10. A vertical passage 45 (Fig. 2), communicating with the float chamber above the level of fuel therein, communicates with passage 42, and passage 45 is arranged to supply air laden with fuel vapor to the compensating nozzle 33.

A third nozzle, commonly termed a slow speed nozzle is arranged in an exterior portion of sections 16 and 17, as shown in Figs. 6 and 10. This nozzle comprises a sleeve 47 into the upper part of which is threaded a valve stem 48 having a knurled head at its upper end which, when cover 22 is closed, is engaged by a spring 49. Fixed to the upper end of sleeve 47 is a disk 50 and fixed in the latter is a pin 51 which depends into a vertical passage 52, formed in sections 16 and 17 and arranged in parallel relation to the sleeve. A lock nut 53 is provided to hold stem 48 in its various positions of adjustment. The lower portion of stem 48 is cupped out, as shown in Fig. 6 and, leading axially upward from the cupped out portion, is a passage 54 which communicates with a lateral passage 55 leading to an annular space 56 between the sleeve 47 and stem 48. An integral flange 57 formed on the stem closely fits the interior of sleeve 47 and closes the annular space 56. Threaded into the base of sleeve 47 is a member 58 which has a frusto-conical upper end to mate in the cupped end of stem 48 and an axial passage 59 of small bore through which fuel may pass to the annular space 56. The space below member 58 is connected by a horizontal passage 60 and a short vertical passage 61 to the described passage 42, as shown in Figs. 2 and 10. The upper end of member 58 and the lower end of stem 48 constitute a valve to control the inflow of air to the passage 54, the inflow of fuel being controlled by the needle valve 44 already described. Air is admitted to an annular space 62 through a hole 63 (Fig. 10) in sleeve 47 which is caused to register by means of pin 51 and disk 50 with a lateral passage 64 leading to the passage 52 already described. Referring to Fig. 7, the upper end of air passage 52 is connected by rectangularly arranged and horizontally disposed passages 65 and 66 to the air space of the carbureter fuel chamber 20, whereby air laden with fuel vapor may pass to the annular space 62 and thence upwardly with fuel from passage 59 into the annular space 56. The latter delivers into suction pipe 26 by means of a hole 67 in sleeve 47 and a lateral passage 68 formed in section 16, as shown in Figs. 5 and 6. The slow nozzle described is particularly advantageous not only on account of simplicity of construction but also on account of its convenient removability. The sleeve 47 may be lifted vertically from its seat when cover 22 is opened without disturbing the adjusted relation of the several parts therein. Thus, it may be readily withdrawn for cleaning, inspection, and adjustment for it is held in its seat simply by the spring 49.

The chamber 21 above described is a fuel supply for the carbureter chamber 20 and means are provided in the chamber 21 for drawing fuel by suction from a low level supply tank. Referring to Figs. 1 and 12, reference 70 indicates a fuel inlet attachment adapted to be connected to the low level supply tank. A bolt 103 having a tapered surface to engage a correspondingly tapered surface on member 70 is threaded into cover 15, as shown in Fig. 12. The lower end of member 70 has a tapered seat in cover 15, the construction being such that member 70 is threaded into cover 15, as shown in Fig. 12. The lower end of member 70 has a tapered seat in cover 15, the construction being such that member 70 is held to the cover by a swivel joint. Member 70 permits fluid to pass into the air space of chamber 21 when a ball valve 104 is opened. A spring 105 normally holds the ball against its seat but permits the opening of the latter when suction is applied to chamber 21 by means to be described. Cover section 15 has an upwardly extending boss which is formed with axially alined passages 71, 72 and 73 of progressively increasing diameter. The passage 73 has lateral openings 74 which communicate with the atmosphere and is closed at the top by a cap 75. A passage 76 connects the passage 72 with the air space of the chamber 21. Loosely fitting and slidable in the passage 71 is a valve stem 77, the upper end of which is necked down to receive a valve 78. The latter is adapted to close the atmospheric connection to passage 76 by seating on the shoulder formed by the intersection of passages 72 and 73 when stem 77 is depressed by means to be described. It is particularly to be noted that valve 78 is movable relatively to stem 77, because of a loose fit therewith, as will be seen from a comparison of Figs. 9 and 11, so that it may close slightly before stem 77 is in its lowermost position and may open shortly after the stem begins to lift. Stem 77 is supported by a leaf spring 79 which is fixed at its ends to posts 80 secured to cover section 15. Threaded into stem 77 is a rod 81 which extends downwardly and is guided in a boss formed in the base section 17. Spring 79 is thus clamped between stem 77 and rod 81 and is arranged to move the stem and rod sharply by snapping from its upwardly curved position shown in Fig. 2 to a similar downwardly curved position when actuated by suitable means. The actuating means comprises a float 82 loosely encircling rod 81, as shown in Figs. 2 and 4. Pivoted in posts 83, depending from cover 15 and on each side of rod 81 are levers 84 which extend in opposite directions on each side of the stem and have projections 85 extending into the path of either of two spaced flanges 86 formed on rod 81, as best shown in Fig. 4. The free ends of levers 84 are connected by links 87 to the top of float 82. It will be seen that as the latter falls, levers 84 are brought to bear on the lower flange 86 and, when they have moved the latter a distance slightly greater than half the throw of spring 79, the stem 77 will be sharply moved the remaining distance by the snapping of the spring into its lowermost position. Thus valve 78 will be sharply closed to stop the entrance of air into chamber 21.

Referring to Figs. 5 and 9, a passage 88 leads from suction pipe 26 on the engine side of a throttle valve 89 and intersecting with this passage is another horizontal passage 90. A valve 91 is slidably mounted in pipe 26 and is arranged to close the intersection of passages 88 and 90. Valve 91 is held pressed against the cam 93 by a spring acting between the interior of pipe 26 and a collar 92 on the valve stem. Collar 92 is arranged in the path of a cam 93 formed on the throttle and the contour of this cam is such as to cause valve 91 to open as throttle 89 opens and so that the effective opening of the suction passage 90 is varied in proportion to the effective opening in suction pipe 26. Passage 90 is connected by vertical and horizontal passages 94 and 95 (Fig. 9), respectively, to the passage 71 within which stem 77 is slidable. The latter has a recess normally positioned as in Fig. 9 so that only a relatively small area of communication is presented between suction passage 95 and the air space of chamber 21. When, however, valve 78 is closed, stem 77 and recess 96 are positioned as in Fig. 11 to allow an unrestricted suction opening into chamber 21. The spring 105 heretofore described has sufficient tension to hold valve 104 closed when recess 96 is positioned as shown in Fig. 9, but permits the opening of the valve when the recess is positioned as in Fig. 11 so that a relatively strong suction is applied to chamber 21.

The latter feeds chamber 20 by gravity through an opening 97 formed in the base section 17 and a pivoted and counter-balanced valve 98 (Figs. 2 and 8) controls this opening. A stem 99 extends from valve 98 into chamber 21 and its end lies between a pair of flanges 100 formed on rod 81. Normally valve 98 is positioned as shown to permit fuel to pass from the chamber 21 to chamber 20. When, however, spring 79 is moved to its lower position, rod 81 is depressed and valve 98 positively closed to stop the flow to chamber 20 until the float 82 again rises. Valve 98 performs the function of the usual check valve, but in addition is positively opened and closed without relying upon the difference in level in the two chambers to effect its actuation. Valve 98 may be held in closed position when desired by a rod 101 vertically mounted in chamber 20 and having its upper part arranged for convenient access when cover 22 is opened. At the lower end of rod 101 a bent portion 102 is provided which may be brought to bear on valve 98 when the rod is turned substantially ninety degrees from the position illustrated.

In the operation of my invention, the rod 101 is suitably turned to release the valve plate 98, and the fuel in the two chambers assumes the same level. The normal level of fuel is shown by the line *a—a* in Fig. 2. As fuel is consumed in the chamber 20 by the several atomizing devices described, it is replaced by fuel from chamber 21. Normally valve 78 lies in the position shown whereby air may enter chamber 21 to displace the fuel fed therefrom. The chamber 21 is always in communication through the passage 95 with the engine intake manifold but this passage is normally restricted by the rod 77 since the recess 96 is raised as shown in Fig. 9. The valve 78 is also normally open and in communication with the passage 95 as well as with the chamber 21 so that the suction in the intake manifold is not communicated to the chamber 21 until the valve 78 is closed. After the fuel in chamber 21 has fallen to a given level, valve 78 is suddenly closed to shut off the air supply to chamber 21, and the suction through passage 95 creates a partial vacuum in chamber 21 opening valve 104 and causing fuel to be drawn into the latter through the inlet attachment 70. As soon as chamber 21 is filled to a predetermined level, valve 78 is sharply raised from its seat permitting air to enter the chamber to stop the flow through attachment 70 and valve 104 is sharply closed by spring 105. Valve 98 automatically closes during the period of inflow to prevent fuel from chamber 20 from returning to chamber 21. It is to be noted that the usual manner of check valve operation is not alone relied upon but a supplementary means positively operable from float 82 is provided to insure correct operation of valve 98. Valve 91 is arranged to open in proportion to the throttle opening so that when the engine is running at slow speed and little fuel is drawn from chamber 20, the continual suction of air from chamber 21 is reduced at a time when little suction is necessary. The valve 91 has the advantage that the suction through passage 95 is varied approximately to the fuel consumed so that, at times of heavy duty, the suction effective to feed chamber 21 is at a maximum, while on small loads when little fuel is required, the valve 91 is nearly closed.

The main, compensating, and slow speed nozzles, comprising the passages 32, 33 and 56, respectively, operate in the usual manner to deliver fuel in pipe 26. For a more detailed description of the manner of operation of these nozzles reference is made to my copending application Serial No. 101,755, filed June 5, 1916.

An important and advantageous feature of the construction described is in the provision of a single float to control the level in the two chambers. Heretofore, the vacuum feed chamber has been connected (usually through an intermediate chamber) to the fuel chamber of the carbureter which in turn has its own float. With the structure described, the carbureter float is eliminated as well as the usual intermediate fuel chamber and the essential parts are here consolidated into a compact unitary structure with the advantages of the usual vacuum fuel feeding devices but with the elimination of the necessity for using, mounting, and connecting various separate and distributed parts which go to make up the usual vacuum feed carbureter system.

The feeding device disclosed is characterized by an advantageous arrangement of parts to obtain an efficacious vacuum feed carbureter without elaborate structure and unnecessary multiplicity of parts. Instead of several independent units arranged at different points and requiring several pipe connections, a single unit is here provided which requires attachment to the engine manifold and a single pipe connection from the supply tank. The vacuum feed device is preferably a unitary structure with the carbureter and all the working parts are located in a single casing for convenient accessibility.

The invention has been described in one preferred form for illustrative purposes, but the scope of the invention is defined by the appended claims rather than by the foregoing description.

What I claim is—

1. A vacuum feed carbureter, comprising a carbureter fuel chamber, atomizing devices in said chamber, adapted to be fed thereform, a fuel supply chamber communicating with the carbureter chamber to feed the latter by gravity, a valve controlling the communication between said chambers, a float in the supply chamber, means controlled by the float to draw fuel into the supply chamber, and means operable by the rise and fall of the float to open and close said valve, all constructed and arranged so that the level in both of said chambers is controlled by a single float.

2. The combination with a carbureter having atomizing devices and a fuel chamber to directly feed the latter of a supply chamber adjacent the fuel chamber and communicating therewith to permit fuel to pass from the supply to the fuel chamber by gravity, a valve controlling the communication between said chambers, a float in the supply chamber, devices controlled by movement of the float to draw fuel into the supply chamber, and means operable from the float to open and close said valve, all constructed and arranged so that fuel is fed to the supply chamber by suction and so that the fuel level in both chambers is controlled by a single float.

3. A vacuum feed carbureter, comprising a casing formed with a carbureter fuel chamber and a fuel supply chamber and a passage connecting the chambers near the base thereof, an air intake pipe associated with the carbureter chamber and adapted for connection to suction means, atomizing devices connected with the carbureter chamber and extending within said pipe to feed fuel to the latter from the carbureter chamber, a float in the supply chamber, a fuel supply connection to the latter, and suction means controllable by the float to draw fuel from said connection into the supply chamber, the latter adapted to feed the carbureter chamber by gravity, all constructed and arranged so that the float controls the level in both the supply and carbureter chambers.

4. A vacuum feed carbureter, comprising, a casing formed with a carbureter fuel chamber and a fuel supply chamber, a connection between the chambers arranged to permit fuel to pass from the supply to the carbureter chamber by gravity, a valve in said connection, a fuel supply connection to the supply chamber, a float in the latter, devices controllable from the float to draw fuel into the supply chamber and means operable from the float to open and close said valve.

5. A fuel feeding device for carbureters, comprising a single casing formed with a carbureter fuel chamber and a fuel supply chamber, a connection between said chambers arranged to permit fuel to pass from the latter to the former, a valve in said connection, a fuel supply connection to the supply chamber, a float in the latter, an air inlet to the supply chamber, a valve in said inlet operable by said float, an air intake pipe passing through the carbureter chamber and adapted for connection to a suction means, a passage connecting the intake with the air space of the supply chamber, means operable from said float to open and close said first-named valve, and a device to lock the latter to prevent flow from the supply chamber when desired.

6. In a fuel feeding device for carbureters, a fuel supply chamber, a float therein, means controlled by the float operable to draw fuel into said chamber, a carbureter fuel chamber, a fuel passage connecting the latter to the fuel supply chamber, a valve in said passage, and means operable by rise and fall of the float to suddenly open and close said valve.

7. In a fuel feeding device for a carbureter, a fuel supply chamber, a carbureter fuel chamber, a connection between the chambers to permit the former to feed the latter, a fuel supply connection to the supply chamber, a suction pipe associated with the carbureter chamber, a passage from said pipe to the air space of the supply chamber, means in said pipe to vary the effective opening therein, a valve in said passage operable from said means and constructed and arranged to be opened in proportion to the effective opening in said pipe.

8. A vacuum feed carbureter, comprising a casing formed with a fuel supply chamber and a carbureter fuel chamber, a suction pipe, a throttle valve in said pipe, a passage connecting the latter to the air space of the supply chamber, a valve in said passage arranged to be opened by and in proportion to the opening of said throttle valve, a fuel supply connection to the supply chamber, an air inlet to the latter, a valve in said inlet, and a float in the supply chamber connected to the last-named valve and arranged to suddenly open and close the latter by its rise and fall, all constructed and arranged so that the suction effective to draw fuel into the supply chamber may be varied in accordance with the effective opening in the suction pipe.

9. The combination in a fuel feeding device for carbureters of a supply chamber, a carbureter fuel chamber, a connection between the chambers to permit the former to feed the latter, a float in the supply chamber, an air inlet and a fuel inlet thereto, a valve in the air inlet arranged to be opened and closed by the rise and fall of said float, a suction pipe, a throttle valve therein, a passage leading from said pipe to the air space of the supply chamber, and a valve in said passage arranged to be opened and closed by the opening and closing of the throttle valve and to vary the effective suction opening to the fuel supply chamber in proportion to the effective opening in the suction pipe.

10. In a fuel feeding device for carbureters, a fuel supply chamber, a float therein, an air inlet to the supply chamber, a valve in said inlet operable to open and close the latter by rise and fall of the float, a suction pipe, a passage from the latter to said chamber, a valve in said passage, a valve in said pipe operable to vary the effective opening of the suction passage valve, a fuel supply connection to the air space of said chamber, a valve in said connection and resilient means normally holding the last-named valve in closed position, all constructed and arranged so that the valve in said connection may be opened by relatively strong suction and closed at times of relatively weak suction by said resilient means.

11. In a fuel feeding device for carbureters, a fuel supply chamber, a float therein, an air inlet to the supply chamber, a valve in said inlet operable to open and close the latter by rise and fall of the float, a passage communicating with the air space of said chamber and adapted for connection to suction means, a fuel supply connection to the air space of said chamber, a valve in said connection, and resilient means normally holding the last-named valve in closed position all constructed and arranged so that the last-named valve may be opened by relatively strong suction and closed at times of relatively weak suction by said means.

12. A vacuum feed carbureter, comprising a fuel supply chamber, a float therein, means controlled by the float operable to draw fuel into said chamber, a carbureter fuel chamber, atomizing devices therein, a fuel passage connecting the carbureter fuel chamber to the fuel supply chamber, a valve in said passage, and means operable by rise of the float to suddenly open said valve.

13. A vacuum feed carbureter, comprising a fuel supply chamber, a float therein, means controlled by the float operable to draw fuel into said chamber, a carbureter fuel chamber, atomizing devices in the latter, a fuel passage connecting the last-named to the first-named chamber, a valve in said passage, and means operable by the falling of the float to suddenly close said valve.

14. In a fuel feeding device for a carbureter, a fuel supply chamber, a carbureter fuel chamber, a connection between the chambers to permit the former to feed the latter, a fuel supply connection to the supply chamber, a suction pipe associated with the carbureter chamber, a passage from said pipe to the air space of the supply chamber, means in said pipe to vary the effective opening therein, a valve in said passage operable from said means and constructed and arranged to be opened in proportion to the effective opening in said pipe, said valve being open for all operative positions of said means.

15. In a fuel feeding device for a carbureter, a fuel supply chamber, a carbureter fuel chamber, a connection between the chambers to permit the former to feed the latter, a fuel supply connection to the supply chamber, a suction pipe associated with the carbureter chamber, a passage from said pipe to the air space of the supply chamber, means in said pipe to vary the effective opening therein, a valve in said passage operable from said means and constructed and arranged to be opened in proportion to the effective opening in said pipe, a float in the fuel supply chamber, and a valve in said passage normally opening to the air and operable by said float to close the opening to the air and render the suction operative through the passage to draw fuel into the fuel supply chamber.

16. In a fuel feeding device for a carbureter, a fuel supply chamber, a fuel supply connection to the fuel supply chamber, an engine intake pipe, a passage from said pipe to the upper part of the fuel supply chamber, means in said pipe to vary the effective opening therein, a valve in said passage associated with said means and adapted to be opened in proportion to the opening in said pipe.

17. In a fuel feeding device for a carbureter, a fuel supply chamber, a fuel supply connection to the fuel supply chamber, an engine intake pipe, a passage from said pipe to the upper part of the fuel supply chamber, means in said pipe to vary the effective opening therein, a valve in said passage associated with said means and adapted to be opened in proportion to the opening in said pipe, a float in the fuel supply chamber and a valve in said passage normally opening to the air and operable by said float to close the opening to the air and render the suction operative through the passage to draw fuel into the fuel supply chamber.

18. In a fuel feeding device for a carbureter, a fuel supply chamber, a fuel supply connection to the fuel supply chamber, an engine intake pipe, a passage from said pipe to the upper part of the fuel supply chamber, said passage communicating said chamber and pipe under all operative conditions of the carbureter, an opening from the fuel supply chamber communicating with the atmosphere, a valve in said opening, which is normally open and means for closing said valve for rendering effective the suction in said passage to draw fuel into the fuel supply chamber.

19. In a fuel feeding device for a carbureter, a fuel supply chamber, a fuel supply connection to the fuel supply chamber, an engine intake pipe, a passage from said pipe to the upper part of the fuel supply chamber, said passage communicating said chamber and pipe under all operative conditions of the carbureter, an opening from the fuel supply chamber communicating with the atmosphere, a valve in said opening which is normally open, and float-controlled means for closing said valve for rendering effective the suction in said passage to draw fuel into the fuel supply chamber.

20. In a fuel feeding device for a carbureter, a fuel supply chamber, a fuel supply connection to the fuel supply chamber, an engine intake pipe, a passage from said pipe to the upper part of the fuel supply chamber, said passage communicating said chamber and pipe under all operative conditions of the carbureter, an opening from the fuel supply chamber communicating with the atmosphere, a valve in said opening which is normally open, a float-controlled means for closing said valve for rendering effective the suction in said passage to draw fuel into the fuel supply chamber, and a valve in said passage for controlling the suction therein.

21. In a fuel feeding device for a carbureter, a fuel supply chamber, a fuel supply connection to the fuel supply chamber, an engine intake pipe, a passage from said pipe to the upper part of the fuel supply chamber, a throttle in said intake pipe, and means operable by said throttle for controlling the vacuum in said chamber.

22. In a fuel feeding device for a carbureter, a fuel supply chamber, a fuel supply connection to the fuel supply chamber, an engine intake pipe, a passage from said pipe to the upper part of the fuel supply chamber, a throttle in said intake pipe, and a valve in said passage operable by said throttle for controlling the vacuum in said chamber.

23. In a fuel feeding device for a carbureter, a fuel supply chamber, a fuel supply connection to the fuel supply chamber, an engine intake pipe, a passage from said pipe to the upper part of the fuel supply chamber, a throttle in said intake pipe and a valve in said passage associated with said throttle and operable therewith to control the vacuum in said chamber.

PIERRE P. GILLES.